United States Patent
He et al.

(10) Patent No.: US 11,780,089 B2
(45) Date of Patent: Oct. 10, 2023

(54) ROBOT CONTROL METHOD AND APPARATUS

(71) Applicant: Siemens Aktiengesellschaft, Munich (DE)

(72) Inventors: Jun Hu He, Zhenjiang (CN); Carlos Morra, Munich (DE)

(73) Assignee: Siemens Aktiengesellschaft, Munich (DE)

(*) Notice: Subject to any disclaimer, the term of this patent is extended or adjusted under 35 U.S.C. 154(b) by 174 days.

(21) Appl. No.: 16/412,653

(22) Filed: May 15, 2019

(65) Prior Publication Data

US 2019/0351552 A1 Nov. 21, 2019

(30) Foreign Application Priority Data

May 17, 2018 (EP) ..................................... 18172912

(51) Int. Cl.
*B25J 9/16* (2006.01)

(52) U.S. Cl.
CPC ........... *B25J 9/1666* (2013.01); *B25J 9/1697* (2013.01)

(58) Field of Classification Search
CPC ...... B25J 9/1666; B25J 9/1697; B25J 9/1664; B25J 9/1661; B25J 9/1676; B25J 9/1674; G05B 2219/40201; G05B 2219/40202; G05B 2219/40203; G05B 2219/40559; G05B 19/4061
See application file for complete search history.

(56) References Cited

U.S. PATENT DOCUMENTS

| 2011/0060462 A1 | 3/2011 | Aurnhammer et al. |
| 2011/0158476 A1 | 6/2011 | Fahn et al. |

(Continued)

FOREIGN PATENT DOCUMENTS

| CN | 104723350 A | 6/2015 |
| JP | 2004243427 A * | 9/2004 |
| WO | WO 2017163251 A2 | 9/2017 |

OTHER PUBLICATIONS

Extended European Search Report dated Nov. 13, 2018.
CA Office Action dated May 5, 2022 in Chinese Application No. 201910286543.7.

*Primary Examiner* — Khoi H Tran
*Assistant Examiner* — Nhi Q Bui
(74) *Attorney, Agent, or Firm* — Harness, Dickey & Pierce, P.L.C.

(57) ABSTRACT

In the field of robot technologies, a robot control method and apparatus are for protecting safety of a human during interaction between the human and a robot. The method includes: detecting a current location of the human; determining at least two regions surrounding the human according to the detected current location; and controlling movement of the robot in any region of the at least two regions, to protect safety of the human during interaction with the robot. Because the region is set surrounding the human, movement of the human does not affect the interaction between the human and the robot. In addition, using a protected object as a target, the robot is controlled to move in regions that surround the human. Compared with a case in which the robot is limited in fixed space, no matter how the human moves, safety of the human may be effectively protected.

15 Claims, 4 Drawing Sheets

(56) References Cited

U.S. PATENT DOCUMENTS

| | | | |
|---|---|---|---|
| 2015/0158178 A1* | 6/2015 | Burmeister | G06T 1/0014 |
| | | | 382/203 |
| 2016/0229068 A1* | 8/2016 | Haman | B25J 9/1676 |
| 2016/0271800 A1* | 9/2016 | Stubbs | G06K 7/10366 |
| 2018/0052466 A1 | 2/2018 | Wu | |
| 2018/0099412 A1* | 4/2018 | Pinter | G16H 40/67 |
| 2019/0070730 A1* | 3/2019 | Morioka | B25J 9/1666 |
| 2019/0105779 A1* | 4/2019 | Einav | B25J 9/1689 |

* cited by examiner

ROBOT CONTROL METHOD AND APPARATUS

PRIORITY STATEMENT

The present application hereby claims priority under 35 U.S.C. § 119 to European patent application number EP18172912.0 filed May 17, 2018, the entire contents of which are hereby incorporated herein by reference.

FIELD

Embodiments of the invention generally relate to the field of robot technologies, and in particular, to a robot control method and apparatus.

BACKGROUND

In the field of industry, for example, manufacturing, more tasks need to be completed by depending on cooperation between humans and robots. How to perform safety detection between humans and robots is one problem urgent to be resolved.

Previously, when robot safety protection is performed, a robot is usually limited in a fixed region (for example, locked in a cage), and the robot can move in only the fixed region. The robot is limited in the fixed region and cannot move in cooperation with movement of a human. Consequently, interaction between the human and the robot is limited. In addition, when the human suddenly moves and falls in the fixed region, the robot may cause damage to the human.

SUMMARY

In at least one embodiment, the present disclosure provides a robot control method and apparatus, which are capable of effectively protecting safety of a human and ensuring interaction between the human and a robot. Regions that surround the human are determined by detecting a current location of the human, and safety of the human during interaction between the human and the robot is protected by controlling movement of the robot in the regions.

Because the regions are set surrounding the human and move with the human, even if the human moves, the interaction between the human and a robot may not be affected. In addition, in such a manner of setting regions that surround the human, using a protected object as a target, the robot is controlled to move in regions that surround the human. Compared with a case in which the robot is limited in fixed space, no matter how the human moves, safety of the human may be effectively protected.

Embodiments of the present disclosure are directed to a robot control method, a robot control apparatus, and a machine-readable medium. Preferred embodiments of the present disclosure are provided by claims. A feature in the dependent claim may be combined with a feature in a corresponding independent claim, and unless particularly stated, the dependent claims may also be combined with each other.

According to a first embodiment, a robot control method is provided and is used for controlling a robot that interacts with a human. The method includes:

detecting a current location of the human;

determining at least two regions that surround the human according to the detected current location of the human; and controlling movement of the robot in any region of the at least two regions, to protect safety of the human during interaction between the human and the robot.

According to a second embodiment, a robot control apparatus is provided and is configured to control a robot that interacts with a human. The apparatus includes:

a detection module, configured to detect a current location of the human;

a region determining module, configured to determine at least two regions that surround the human according to the current location of the human detected by the detection module; and a robot control module, configured to control movement of the robot in any region of the at least two regions, to protect safety of the human during interaction between the human and the robot.

According to a third embodiment, a robot control apparatus is provided. The apparatus includes:

at least one memory, configured to store machine-readable code; and at least one processor, configured to call the machine-readable code to perform the method provided by the first embodiment.

According to a fourth embodiment, a machine-readable medium is provided. The machine-readable medium stores machine-readable code, where the machine-readable code, when called by at least one processor, causes the at least one process to perform the method provided by the first embodiment.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

Figure 1:
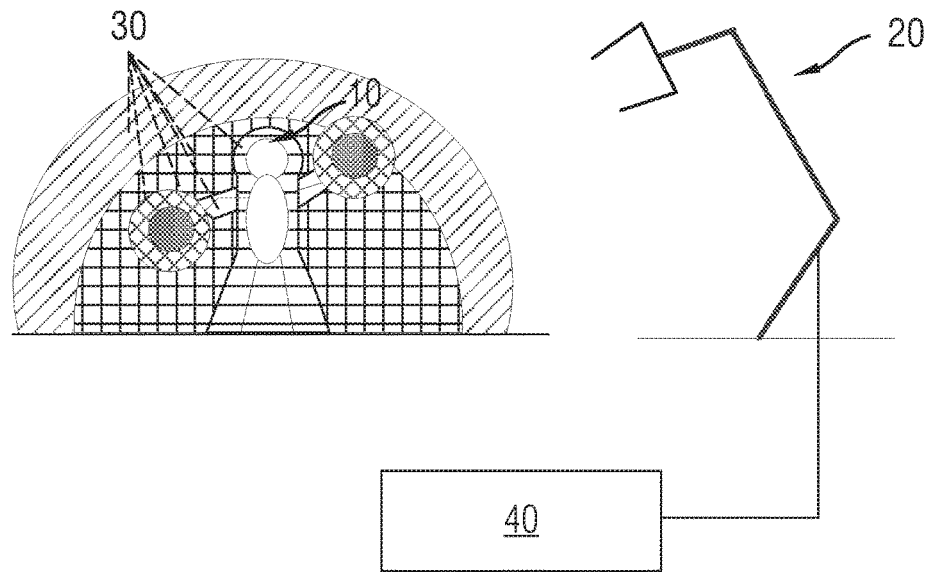
FIG. 1, and FIG. 2A to FIG. 2C are schematic diagrams of control working manners of a robot control apparatus according to an embodiment of the present invention.

| Reference numerals: |
| --- |
| 10: human |
| 20: robot |
| 30: region |
| 301: movement forbidden region |
| 3011: first movement forbidden region |
| 3012: second movement forbidden region |
| 3013: third movement forbidden region |
| 302: interaction allowed region |
| 303: free movement region |

| Reference numerals: |
| --- |
| 304: slow movement region |
| 40: robot control apparatus |
| 411: detector |
| 412: label |
| 401: detection module |
| 402: region determining module |
| 403: robot control module |
| 404: at least one memory |
| 405: at least one processor |
| S301: detect a current location of a human 10 |
| S302: determine at least two regions 30 that surround the human 10 |
| S303: control movement of the robot 20 in any region 30 of the at least two regions 30 |
| S3031: detect a current location of a robot 20 |
| S3032: determine a region 30 in which the current location of the robot 20 is located |
| S3033: control movement of the robot 20 according to a corresponding control manner set for the region 30 in which the current location of the robot 20 is located |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

To let those skilled in the art better understand the technical solution of the present invention, the following will clearly and completely describe the technical solution in the embodiments of the present invention in combination with the drawings in the embodiments of the present invention. Obviously, the embodiments described are only a part, but not all of the embodiments of the present invention. All other embodiments obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. These terms are only used to distinguish one element from another. It should be understood that the data used in such a way can be interchanged as appropriate so that the described embodiments of the present invention can be implemented in an order other than that shown or described here. As used herein, the term "and/or," includes any and all combinations of one or more of the associated listed items. The phrase "at least one of" has the same meaning as "and/or". In addition, the terms "comprise" and "have" and their variants are intended to cover non-exclusive inclusions. For example, the process or method comprising a series of steps or the system, product or equipment comprising a series of modules or units are unnecessarily limited to those clearly-listed steps or modules or units, but can comprise other steps or modules or units which are not clearly listed or are intrinsic to the process, method, product or equipment.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv)

source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to a first embodiment, a robot control method is provided and is used for controlling a robot that interacts with a human. The method includes:
  detecting a current location of the human;
  determining at least two regions that surround the human according to the detected current location of the human; and
  controlling movement of the robot in any region of the at least two regions, to protect safety of the human during interaction between the human and the robot.

According to a second embodiment, a robot control apparatus is provided and is configured to control a robot that interacts with a human. The apparatus includes:
  a detection module, configured to detect a current location of the human;
  a region determining module, configured to determine at least two regions that surround the human according to the current location of the human detected by the detection module; and
  a robot control module, configured to control movement of the robot in any region of the at least two regions, to protect safety of the human during interaction between the human and the robot.

According to a third embodiment, a robot control apparatus is provided. The apparatus includes:
- at least one memory, configured to store machine-readable code; and
- at least one processor, configured to call the machine-readable code to perform the method provided by the first embodiment.

According to a fourth embodiment, a machine-readable medium is provided. The machine-readable medium stores machine-readable code, where the machine-readable code, when called by at least one processor, causes the at least one process to perform the method provided by the first embodiment.

Optionally, movement of the robot may be controlled by using the following manners:
- detecting a current location of the robot;
- determining the region in which the current location of the robot is located; and
- controlling movement of the robot according to a corresponding manner set for the region in which the current location of the robot is located.

Optionally, a type of the at least two regions that surround the human includes at least one of the following types: a movement forbidden region, an interaction allowed region, and a free movement region, where the robot may be forbidden to move in the movement forbidden region, is allowed to interact with the human in the interaction allowed region, and is allowed to freely move in the free movement region.

Optionally, the movement forbidden region may include at least one of the following regions:
- a first movement forbidden region that surrounds other parts of the human than an interaction part used during interaction with the robot;
- a second movement forbidden region determined according to a recorded highest position of the human, where the second movement forbidden region is used for protecting safety of the human when the human suddenly moves; and
- a third movement forbidden region that surrounds the interaction allowed region.

Optionally, the type of the at least two regions further includes a slow movement region, where the slow movement region surrounds the movement forbidden region, and may control the robot to move in the slow movement region at a speed not higher than a preset speed threshold.

The foregoing classifying setting is performed on the regions that surround the human, and safety of key parts of the human is protected by forbidding the robot to move in the movement forbidden region. By setting a region surrounding a part (for example, a hand) that performs interaction between the human and the robot as the interaction allowed region, the robot is controlled to interact with the human in the region, and the human effectively interacts with the robot while safety of the human is ensured. By setting a region that surrounds the interaction allowed region as the movement forbidden region, the robot stops when near the human, and the human actively moves to the robot, so that the robot enters the interaction allowed region.

The human dominates the interaction process instead of the robot. This protects safety of the human more effectively. By setting a periphery region that surrounds the movement forbidden region as the slow movement region, in a process of moving to the human, the robot is enabled to have enough time to slow down before entering a forbidden region. This ensures that the robot is static in the movement forbidden region, thereby effectively protecting safety of the human. In consideration of sudden movement of the human, for example, falling down or waving, a movement forbidden region is set according to a recorded highest position of the human. In this way, even if the human suddenly moves, the robot cannot cause damage to the human.

Optionally, a priority may be respectively set for each type of region. When regions of different priorities overlap each other, the robot may be controlled to move in an overlapped region according to a corresponding manner set for a region of a high priority. In this way, a problem of controlling the robot when different regions overlap each other is resolved. By setting the priority, not only safety of the human is protected, but also interaction between the human and the robot is implemented while the human is safe.

Optionally, in the solution provided by the present disclosure, control of the robot may be independently executed of an internal control apparatus of the robot. By using an external apparatus independent of the internal control apparatus of the robot, the position of the human is detected, regions that surround the human are determined, and the robot is controlled to move in the regions. Control of the robot does not depend on a sensor built in the robot. Even if an internal sensor of the robot is invalid, the robot may be effectively controlled and is prevented from causing damage to the human.

Hereinafter, above-mentioned and other features of the present technique are described in details. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

As described above, previously, a manner in which a robot is limited in a fixed region to perform safety protection. This limits interaction between the human and the robot. This also cannot avoid damage that the robot may cause to the human when the human suddenly moves.

In an embodiment of the present invention, regions that surround the human are determined by detecting a current location of the human, and safety of the human during interaction between the human and the robot is protected by controlling movement of the robot in the regions. Because the regions are set surrounding the human and move with the human, even if the human moves, the interaction between the human and a robot may not be affected. In addition, in such a manner of setting regions that surround the human, using a protected object as a target, the robot is controlled to move in regions that surround the human. Compared with a case in which the robot is limited in fixed space, no matter how the human moves, safety of the human may be effectively protected.

A previous safety protection method mainly depends on a sensor built in the robot to control the robot. However, when the robot is out of control, the human who interacts with the robot is in a dangerous state. In an embodiment of the present invention, by using an external apparatus independent of an internal control apparatus of the robot, a position of the human is detected, regions that surround the human are determined, and the robot is controlled to move in the regions. Control of the robot does not depend on the sensor built in the robot. Even if an internal sensor of the robot is invalid, the robot may be effectively controlled and is prevented from causing damage to the human.

In an embodiment of the present invention, regions that surround a human may be classified. For example, a region that surrounds a head and a body of the human is set as a movement forbidden region to forbid a robot to move in the region, thereby protecting safety of key parts of the human. A region surrounding a part (for example, a hand) that performs interaction between the human and the robot is set as an interaction allowed region, and the robot is controlled to interact with the human in the region, so that the human effectively interacts with the robot while safety of the human is ensured. A region that surrounds the interaction allowed region is set as the movement forbidden region, the robot stops when near the human, and the human actively moves to the robot, so that the robot enters the interaction allowed region.

The human dominates the interaction process instead of the robot. This protects safety of the human more effectively. In addition, a periphery region that surrounds the movement forbidden region may further be set as the slow movement region, in a process of moving to the human, the robot is enabled to have enough time to slow down before entering a forbidden region. This ensures that the robot is static in the movement forbidden region, thereby effectively protecting safety of the human. Moreover, in consideration of sudden movement of the human, for example, falling down or waving, a movement forbidden region is set according to a recorded highest position of the human. In this way, even if the human suddenly moves, the robot cannot cause damage to the human.

The following describes embodiments of the present invention in detail with reference to the accompanying drawings.

FIG. 1 a schematic diagram of a manner in which a robot control apparatus 40 controls a robot 20 during interaction between a human 10 and the robot 20.

The robot control apparatus 40 detects a current location of the human 10, and determines at least two regions 30 that surround the human 10 according to the current location of the human, so as to control movement of the robot 20 in any region 30 of the at least two regions 30, to protect safety of the human 10 during the interaction between the human 10 and the robot 20.

The robot control apparatus 40 may run independently of an internal control apparatus of the robot 20, or may be implemented by the internal control apparatus of the robot 20. When running independently of an internal control apparatus of the robot 20, the robot control apparatus 40 may independently detect the position of the human, determine the regions that surround the human, and control the robot to move in the regions. Control of the robot does not depend on a sensor built in the robot. Even if an internal sensor of the robot is invalid, the robot may be effectively controlled.

When the robot control apparatus 40 runs independently of the internal control apparatus of the robot 20, there may be a case that, the robot 20 needs to move, according to a control logic of the internal control apparatus of the robot 20, in a current moment to perform an operation. However, according to determination of the robot control apparatus 40, the robot 20 enters a region that is quite close to a head of the human 10 and needs to stop moving (to be prevented from causing damage to the human 10). In an implementation, a priority with which the robot control apparatus 40 controls the robot 20 is higher than the internal control apparatus of the robot 20, and the robot 20 stops moving according to an instruction of the robot control apparatus 40.

Figure 2A:
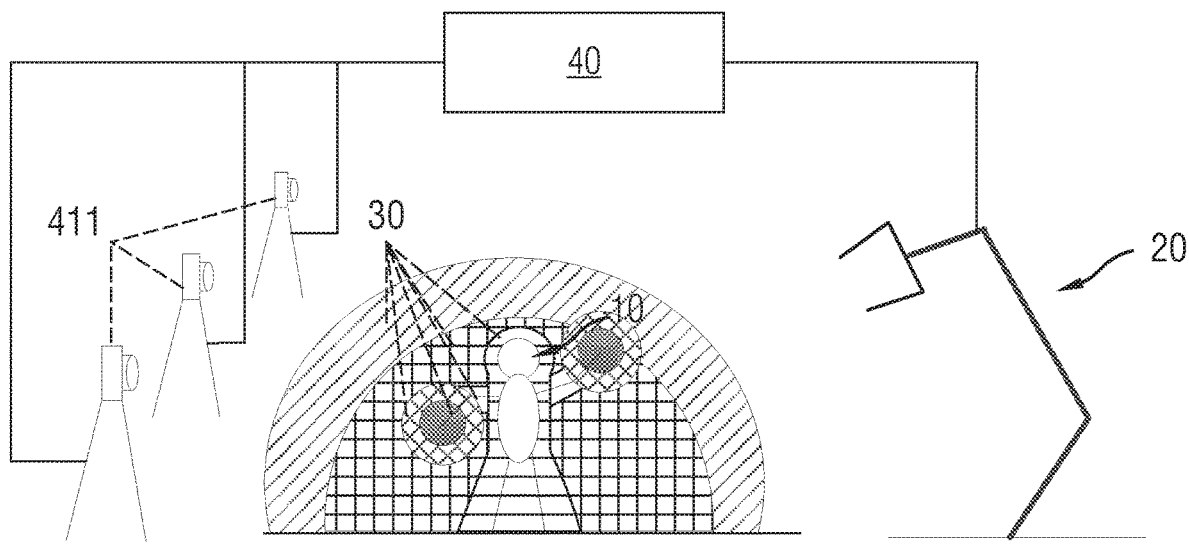
Figure 2B:
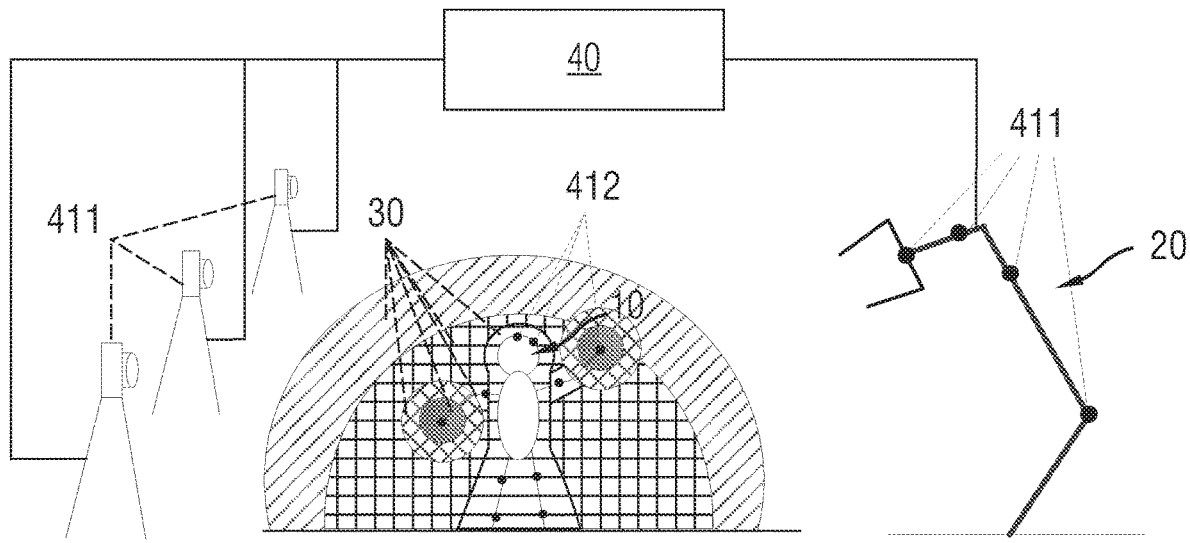
Figure 2C:
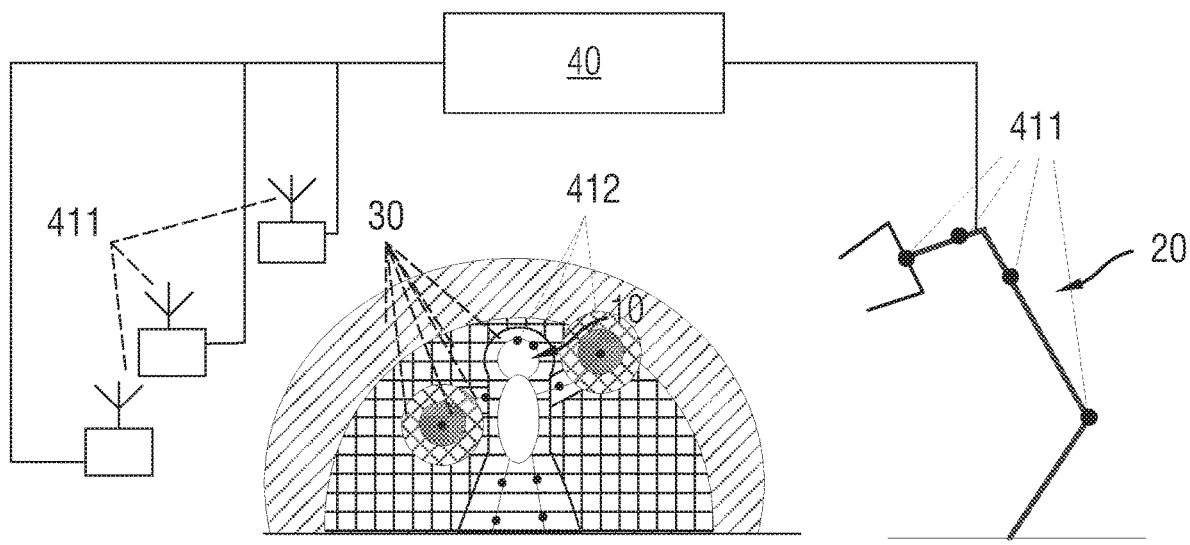

There are multiple optional implementations when the robot control apparatus 40 detects the current location of the human 10 and controls the robot 20, and FIG. 2A to FIG. 2C are used as examples for description herein. Manners that may be used are not limited to these examples.

In an example shown in FIG. 2A, the robot control apparatus 40 tracks the human 10 and the robot 20 by using at least one camera, determines the current location of the human 10 and the current location of the robot 20 by using an image recognition technology or the like, accordingly determines the at least two regions 30, and controls movement of the robot 20 in the regions 30.

In an example shown in FIG. 2B, the robot control apparatus 40 tracks labels 412 on the human 10 and the robot 20 by using at least one camera, determines the current location of the human 10 and the current location of the robot 20 by using the labels 412, accordingly determines the at least two regions 30, and controls movement of the robot 20 in the regions 30.

In an example shown in FIG. 2C, the robot control apparatus 40 tracks labels 412 on the human 10 and the robot 20 by using at least one radio detector. The label 412 has a radio transmission function and may transmit a radio signal. The radio detector has a radio receiving function and may receive a radio signal. The labels 412 may transmit signals by using same transmit power. The robot control apparatus 40 may compare power of a radio signal received by the radio detector with pre-learned transmit power of the labels 412, and determine a distance between each label 412 and the radio detector according to strength of the signal. In addition, by detecting an angle of arrival when the signal transmitted by the label 412 arrives at the radio detection, the radio detector determines a position of the label 412 according to the angle of arrival and the distance.

Herein, the camera, radio detector, or the like for detecting the position of the human 10 and/or the robot 20 is referred to as a "detector 411". A device configured to mark each part of the human 10 and/or the robot 20 is referred to as a "label 412" in FIG. 2B and FIG. 2C.

Optionally, multiple detectors 411 may be disposed at different positions, to avoid a problem that some parts of the human 10 and/or the robot 20 are blocked by another part and a position cannot be accurately determined when the human 10 and/or the robot 20 are at some positions. The label 412 may be disposed on protection clothes worn by the human 10, for example, a helmet, a top, trousers, shoes, or gloves.

In FIG. 2B and FIG. 2C, the labels 412 may be disposed at several key parts of the human 10, for example, a head, a body, and a hand of the human and a part that interacts with the robot 20, an upper limb, a lower limb, and the like, so as to mark each part of the human 10. When the robot control apparatus 40 determines the current location of the human 10, a position of each part is respectively determined. The labels 412 may also be disposed at several key parts of the robot 20. Using a robotic arm as an example, the labels 412 may be disposed at each articulation and gripper of the robotic arm. When determining the current location of the robot 20, the robot control apparatus 40 may respectively determine a position of each of the marked parts. When determining which region 30 that the robot 20 enters, the robot control apparatus 40 may determine a position relationship between each label 412 of the robot 20 and each label 412 of the human 10, thereby determining the region 30 that the robot 20 enters according to a determination result. Alternatively, the position of each part of the human may be respectively determined according to each label 412 of the human 10, and the position of each part of the robot 20 is determined according to each label 412 of the robot 20. In this way, the region 30 that the robot 20 enters is determined according to the determined position of each part of the human and the determined position of each part of the robot 20.

Figure 3:
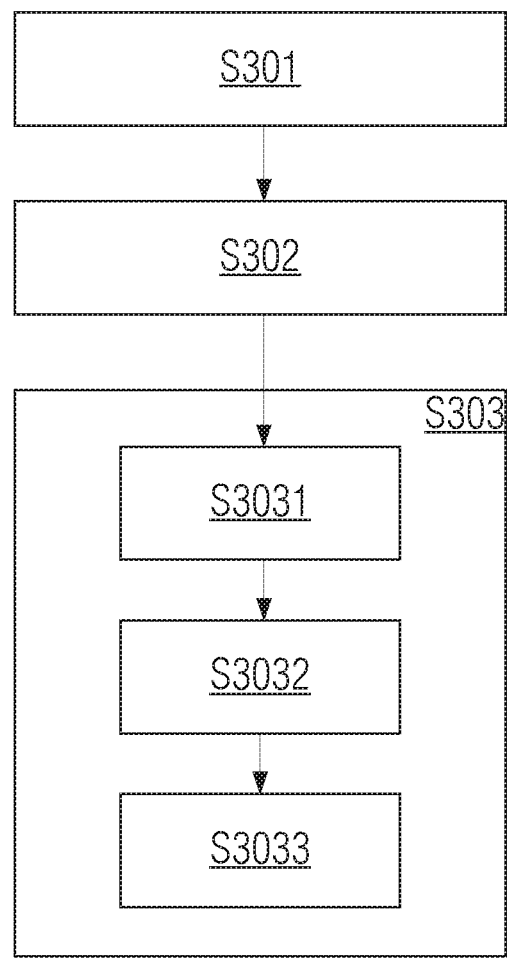
FIG. 3 is a flowchart of a robot control method according to an embodiment of the present invention.

The following describes a procedure of a robot control method according to an embodiment of the present invention with reference to FIG. 3. The method may be performed by the robot control apparatus 40. As shown in the FIG. 3, the procedure may include the following steps.

S301: Detect a current location of a human 10.

For example, a current location of each key part of the human described above may be determined.

S302: Determine at least two regions 30 that surround the human 10.

The regions 30 may be divided into multiple types, for example, a movement forbidden region 301, an interaction allowed region 302, a free movement region 303, and a slow movement region 304. The movement forbidden region 301 may further be divided into a first movement forbidden region 3011, a second movement forbidden region 3012, and a third movement forbidden region 3013. Herein, description is made by using an example in which a hand of the human 10 serves as an interaction part used during interaction with the robot 20.

S303: Control movement of the robot 20 in any region 30 of the at least two regions 30.

Step S303 may further include the following substeps:

S3031: Detect a current location of a robot 20.

S3032: Determine a region 30 in which the current location of the robot 20 is located.

S3033: Control movement of the robot 20 according to a corresponding control manner set for the region 30 in which the current location of the robot 20 is located.

Figure 4:
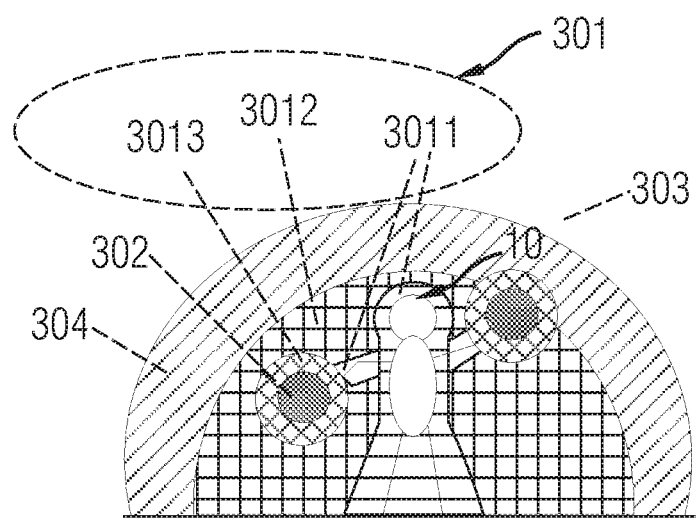
FIG. 4 is a schematic diagram of a safe region according to an embodiment of the present invention.

The following describes each type of region 30 with reference to FIG. 4 and the following table.

| Region mark | Region name | Region meaning | Region calculation manner | Movement of a robot 20 | Priority |
|---|---|---|---|---|---|
| 301 | Movement forbidden region | | | | |
| 3011 | First movement forbidden region | A region that surrounds other parts of a human 10 than an interaction part used during interaction with the robot 20. Herein, using hands as the interaction parts, the first movement forbidden region may include: A spherical region that surrounds a head of the human 10, a cylindrical region that surrounds a body and feet of the human 10, and cylindrical regions that surround arms of the human 10. | The spherical region that surrounds the head of the human 10, and the cylindrical region that surrounds the body and feet of the human 10 may be determined according to the feet and the body of the human 10, for example, determined according to locations of labels disposed at the head and the body of the human 10. The cylindrical region that surrounds the arm of the human 10 may be determined according to positions of a shoulder, an elbow, a wrist and/or a hand of the human 10, for example, determined according to positions of labels disposed at the parts. | Movement forbidden | highest |
| 3012 | Second movement forbidden region | Determined according to a recorded highest position of the human 10 and used for protecting safety of the human 10 when the human 10 suddenly moves. For example, the region may be of a hemispheric shape that uses a position where the human stands as a center of a sphere and a distance slightly greater than that from the highest position of the human 10 to the ground as a radius. A specific value of the radius may be determined based on engineering practice. The region is set in consideration of safety protection for the human when the human suddenly moves, for example, waving or falling down. | The region may be determined according to the highest position of the human 10, for example, determined according to a position of a label disposed at the top of a helmet of the human 10 and a position of a label disposed on a hand of the human (considering that the human waves). | Movement forbidden | medium |
| 3013 | Third movement forbidden region | A region that surrounds an interaction allowed region 302 and that does not include the interaction allowed region 302. Using a hand of the human 10 serving as an interaction part used during interaction with the robot 20 as an example, the interaction allowed region 302 may be a spherical region that uses the hand as a center of the sphere. The third movement forbidden region 3013 may be a | The region may be determined according to a position of the elbow, the hand/wrist of the human 10, for example, determined according to positions of labels disposed at the elbow and the hand/wrist of the human 10 | Movement forbidden | High |

| Region mark | Region name | Region meaning | Region calculation manner | Movement of a robot 20 | Priority |
|---|---|---|---|---|---|
| | | hollow spherical region that also uses the hand as a center of the sphere and that removes the internal interaction region 302. Optionally, a radius of the third movement forbidden region 3013 is less than a distance between the hand and an elbow. The region is set in consideration that when the interaction part of the human 10 is close to an interaction of the robot 20 such as a gripper, the robot 20 enters the third movement forbidden region 3013, stops, and waits unit the human 10 is further close to the robot 20 actively. Therefore, the interaction part of the robot 20 enters the interaction allowed region 302 and interacts with the human 10. | | | |
| 302 | Interaction allowed region | The robot 20 may interact with the human 10 in this region. Using a hand of the human 10 serving as an interaction part as an example, the region may be a spherical region that uses the hand of the human 10 as a center of the sphere. | The region may be predetermined according to an interaction action between the human 10 and the robot 20 | An interaction of the robot 20 moves at a speed not greater than a first preset speed threshold | High |
| 304 | Slow movement region | A region that surrounds the movement forbidden region 301. An objective of setting the region is in consideration of factors such as moving inertial of the robot, a signal transmission delay of a signal that controls the robot 20, and a responding delay of a motor that drives the robot 20 to move. The robot is enabled to have enough time to slow down in a process of entering the movement forbidden region 301 from a free movement region 303, so as to ensure that the robot stop after entering the movement forbidden region 301. | Determined according to a position of the human 10 | A moving speed of the robot 20 is not greater than a second preset speed threshold | Low |
| 303 | Free movement region | Another region other than the foregoing regions. "Free" does not mean that the robot 20 may randomly move. The robot 20 still moves under control of a program. For example, the robot may mount a part taken from the human 10 on an automobile and the like. When the robot 20 is located in this region, a robot control apparatus 40 may also detect a position of the robot 20, to ensure that the robot 20 may be promptly controlled when the robot 20 enters a region other than the free movement region 303. | | No limitation | Not involved |

The foregoing regions are set surrounding the human 10. A distance between a boundary of the region and the human 10 may be flexibly set according to engineering practice, for example, according to the volume of the robot 20, an interaction action between the human 10 and the robot 20, and the like. In this way, safety of the human 10 is ensured and interaction between the human 10 and the robot 20 is not affected. For example, a distance between a boundary of the first movement forbidden region 3011 and the head or body of the human 10 is not greater than a first distance threshold. A distance between a boundary of the second movement forbidden region 3012 and the recorded highest position of the human 10 is not greater than a second distance threshold. A distance between a boundary of the interaction allowed region 302 and the interaction part of the human 10 is not less than a third distance threshold and is not greater than a fourth distance threshold. A distance between a boundary of the slow movement region 304 and a boundary of the movement forbidden region 301 is not greater than a fifth threshold, and the like.

As shown in a last column in the foregoing table, the priority is respectively set for each type of region. In step S303, when the regions 30 of different priorities overlap each other, the robot control apparatus 40 may control the robot 20 to move in the overlapped region according to a corresponding control manner set for the region 30 of a high priority. Priorities in the foregoing table are "highest→high-→medium→low" in descending order.

For example, when the human 10 puts the hand near the body, the interaction allowed region 302 may partially overlap the first movement forbidden region 3011. Because the first movement forbidden region 3011 and the movement forbidden region have the "highest" priority, and the interaction allowed region 302 has the "high" priority, when the robot 20 enters the overlapped region, the robot 20 is forbidden to move in the overlapped region according to a corresponding control manner of the first movement forbidden region 3011 having a higher priority. In this way, the robot 20 is prevented from causing damage to the human. In addition, considering that when interacting with the robot, for example, interacting with the robot by using the hand, the human usually reaches out an arm to the robot instead of pulling the hand close to the body. Therefore, when the hand of the human is near the body, generally, this does not mean to interact with the robot. By setting priorities of the first movement forbidden region 3011, the movement forbidden region, and the free movement region 303, an interaction intention of the human 10 with the robot 20 is confirmed.

The foregoing describes the procedure in which the robot control apparatus 40 controls the robot in this embodiment of the present invention. The following describes several optional implementations of the robot control apparatus 40.

Figure 6:
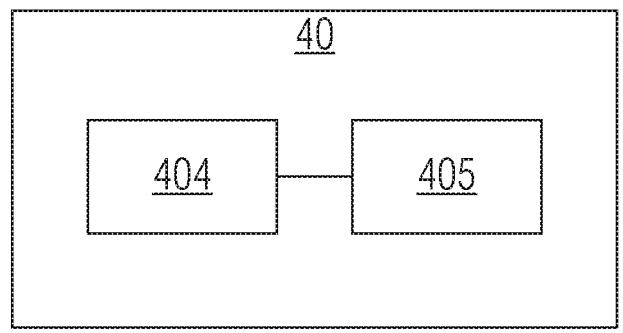
FIG. 6 is another schematic structural diagram of a robot control apparatus according to an embodiment of the present invention.

As shown in FIG. 6, the robot control apparatus 40 may include at least one memory 404 configured to store machine-readable code, and at least one processor 405 configured to call the machine-readable code to perform the foregoing robot control procedure.

Figure 5:
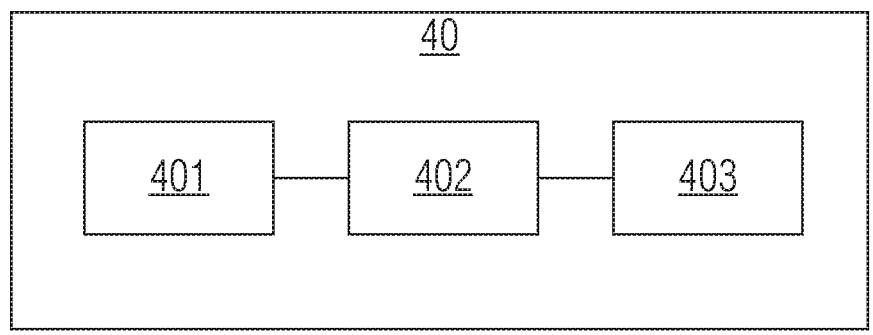
FIG. 5 is a schematic structural diagram of a robot control apparatus according to an embodiment of the present invention.

As shown in FIG. 5, the robot control apparatus 40 may include a detection module 401, configured to detect a current location of a human 10; a region determining module 402, configured to determine at least two regions 30 that surround the human 10 according to the current location of the human 10 detected by the detection module 401; and a robot control module 403, configured to control movement of the robot 20 in any region 30 of the at least two regions 30, to protect safety of the human 10 during interaction between the human 10 and the robot 20.

Each module in FIG. 5 may be a function module for implementing each function in the robot control apparatus 40. For example, the detection module 401 may be configured to detect the current location of the human 10 and/or a current location of the robot 20; the region determining module 402 may be configured to determine each region 30 that surround the human 10; and the robot control module 403 may be configured to control the movement of the robot 20 in each region, to ensure safety of the human 10. Control logics of these function modules may be pre-burned on chips such as a field programmable gate array (FPGA), a complex programmable logic device (CPLD), and a system on chip (SoC). After being powered on, the chip implements the pre-burned control logic to control the robot 20.

Modules in FIG. 5 may alternatively be viewed as the machine-readable code in the robot control apparatus 40 stored in the at least one memory 404. The machine-readable code may comprise the foregoing modules and may be called by the at least one processor 405 to perform the robot control procedure of this embodiment of the present invention.

In addition, an embodiment of the present invention further provides a machine-readable medium stored a machine-readable instruction, and the machine-readable instruction, when executed by the processor, causes the processor to perform any one of the foregoing methods. Specifically, a system or an apparatus that is equipped with the machine-readable medium may be provided. The machine-readable medium stores software program code that implements functions of any embodiment in the foregoing embodiments, and a computer or processor of the system or the apparatus is enabled to read and execute the machine-readable instruction stored in the machine-readable medium.

In such a case, the program code read from the machine-readable medium may implement a function of any one of the implementations in the foregoing embodiment. Therefore, the machine-readable code and the machine-readable medium storing the machine-readable code construct a part of the present invention.

Embodiments of the machine-readable medium include a floppy disk, a hard disk, a magneto-optical disk, an optical memory (such as a CD-ROM, a CD-R, a CD-RW, a DVD-ROM, a DVD-RAM, a DVD-RW, and a DVD+RW), a magnetic tape, a non-volatile storage card, and a ROM. Optionally, the program code may be downloaded from a server computer or a cloud through a communications network.

It should be noted that, all steps and modules in the foregoing procedures and structural diagrams of systems are not necessary, some steps or modules may be omitted according to actual requirements. An execution order of the steps is not fixed, and may be adjusted as needed. System structures described in the foregoing embodiments may be of physical structures or logical structures. That is, some modules may be implemented by a same physical entity, or some modules may be respectively implemented by multiple physical entities, or may be implemented together by some elements in multiple independent devices.

In the foregoing embodiments, a hardware unit may be implemented in a mechanical manner or an electrical manner. For example, a hardware unit may include a permanent private circuit or logic (for example, a dedicated processor such as an FPGA or ASIC) to complete a corresponding operation. The hardware unit may further include a programmable logic or circuit (for example, a general purpose processor or another programmable processor) and may complete a corresponding operation after being temporarily set by hardware. A specific implementation (the mechanical manner, the permanent private circuit, or a temporarily set circuit) may be determined based on costs and time.

The foregoing specification shows and describes the present invention in detail with reference to the accompanying drawings and preferred embodiments. However, the present invention is not limited to theses disclosed embodiments. Based on the foregoing embodiments, a person skilled in the art may learn that more embodiments of the present invention may be obtained by combining code checking aspects in the different embodiments, and these embodiments also fall within the protection scope of the present invention.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A robot control method, for controlling a robot during interaction with a human, the method comprising:
   detecting a current location of the human;
   determining at least four regions surrounding the human according to the current location of the human detected, a type of the at least four regions including at least a movement forbidden region, an interaction allowed region, a free movement region, and a slow movement region, the slow movement region surrounding the movement forbidden region, and the movement forbidden region including a first movement forbidden region determined according to a recorded relatively highest position of the human and a third movement forbidden region surrounding the interaction allowed region, wherein the first movement forbidden region is u sable for protecting safety of the human upon the human moving suddenly and the third movement forbidden region prevents the robot from entering the interaction allowed region without the human moving the interaction allowed region to the robot such that the robot may interact with the human in the interaction allowed region in response to the interaction allowed region being moved to the robot; and
   controlling movement of the robot in any region of the at least four regions, to protect safety of the human during interaction between the human and the robot, the controlling the movement including
   controlling the robot not to move in the movement forbidden region,
   controlling the robot to interact with the human in the interaction allowed region by controlling the robot to move in the interaction allowed region in response to a movement of the human,
   controlling the robot to freely move in the free movement region, and
   controlling the robot to move in the slow movement region at a speed not higher than a speed threshold configured to ensure that the robot stops after entering the movement forbidden region.

2. The method of claim 1, wherein the controlling the movement of the robot comprises:
   detecting a current location of the robot;
   determining the region in which the current location of the robot is located; and
   controlling the movement of the robot according to a corresponding control manner set for the region in which the current location of the robot is located.

3. The method of claim 1, wherein the movement forbidden region further comprises a second movement forbidden region surrounding parts of the human other than an interaction part used during interaction with the robot.

4. The method of claim 1, further comprising:
   respectively setting a priority for each type of region of the at least four regions,
   wherein, upon regions of different priorities overlapping each other, the controlling the movement of the robot includes controlling the robot to move in the overlapped region according to a corresponding control manner set for a region, of the overlapped regions, having a relatively highest priority among the overlapped regions.

5. The method according to claim 1, wherein the method is performed by an external control apparatus independent of an internal control apparatus of the robot.

6. A robot control apparatus, for controlling a robot during interaction with a human, the apparatus comprising:
   at least one memory, configured to store machine-readable code; and
   at least one processor, configured to call the machine-readable code to cause the apparatus to:
   detect a current location of the human;
   determine at least four regions surrounding the human according to the current location of the human detected, a type of the at least four regions including at least a movement forbidden region, an interaction allowed region, a free movement region, and a slow movement region, the slow movement region surrounding the movement forbidden region, and the movement forbidden region including a first movement forbidden region determined according to a recorded relatively highest position of the human and a third movement forbidden region surrounding the interaction allowed region, wherein the first movement forbidden region is u sable for protecting safety of the human upon the human moving suddenly and the third movement forbidden region prevents the robot from entering the interaction allowed region without the human moving the interaction allowed region to the robot such that the robot may interact with the human in the interaction allowed region in response to the interaction allowed region being moved to the robot; and
   control movement of the robot in any region of the at least four regions, to protect safety of the human during interaction between the human and the robot by
   controlling the robot not to move in the movement forbidden region,
   controlling the robot to interact with the human in the interaction allowed region by controlling the robot to move in the interaction allowed region in response to a movement of the human, controlling the robot to freely move in the free movement, and controlling the robot to move in the slow movement region at a speed not higher than a speed threshold configured to ensure that the robot stops after entering the movement forbidden region.

7. The apparatus of claim 6, wherein the at least one processor is further configured to cause the apparatus to, when controlling the movement of the robot, at least:

detect a current location of the robot;

determine the region in which the current location of the robot is located; and control the movement of the robot according to a corresponding control manner set for the region in which the current location of the robot is located.

8. The apparatus of claim 6, wherein the movement forbidden region further comprises a second movement forbidden region surrounding parts of the human other than an interaction part used during interaction with the robot.

9. The apparatus of claim 6, wherein the at least one processor is further configured to cause the apparatus to at least:

respectively set a priority for each type of region of the at least four regions; and upon regions of different priorities overlapping each other, control the robot to move in the overlapped region according to a corresponding control manner set for a region, of the overlapped regions, having a relatively highest priority among the overlapped regions.

10. The apparatus of claim 6, wherein the apparatus is an external control apparatus independent of an internal control apparatus of the robot.

11. A non-transitory machine-readable medium, storing machine-readable code, wherein the machine-readable code, when called by at least one processor, causes the at least one processor to perform a method for controlling a robot during interaction with a human, the method including at least:

detecting a current location of the human;

determining at least four regions surrounding the human according to the current location of the human detected, a type of the four regions including at least a movement forbidden region, an interaction allowed region, a free movement region, and a slow movement region, the slow movement region surrounding the movement forbidden region, and the movement forbidden region including a first movement forbidden region determined according to a recorded relatively highest position of the human and a third movement forbidden region surrounding the interaction allowed region, wherein the first movement forbidden region is usable for protecting safety of the human upon the human moving suddenly and the third movement forbidden region prevents the robot from entering the interaction allowed region without the human moving the interaction allowed region to the robot such that the robot may interact with the human in the interaction allowed region in response to the interaction allowed region being moved to the robot; and controlling movement of the robot in any region of the at least four regions, to protect safety of the human during interaction between the human and the robot, the controlling the movement including controlling the robot not to move in the movement forbidden region, controlling the robot to interact with the human in the interaction allowed region by controlling the robot to move in the interaction allowed region in response to a movement of the human, controlling the robot to freely move in the free movement region, and controlling the robot to move in the slow movement region at a speed not higher than a speed threshold configured to ensure that the robot stops after entering the movement forbidden region.

12. The non-transitory machine-readable medium of claim 11, wherein the method further comprises:

detecting a current location of the robot;

determining the region in which the current location of the robot is located; and controlling the movement of the robot according to a corresponding control manner set for the region in which the current location of the robot is located.

13. The non-transitory machine-readable medium of claim 11, wherein the movement forbidden region further comprises a second movement forbidden region surrounding parts of the human other than an interaction part used during interaction with the robot.

14. The non-transitory machine-readable medium of claim 11, wherein the machine-readable code, when called by the at least one processor, causes the at least one processor to respectively set a priority for each type of region of the at least four regions; and upon regions of different priorities overlapping each other, the controlling the movement of the robot includes controlling the robot to move in the overlapped region according to a corresponding control manner set for a region, of the overlapped regions, having a relatively highest priority among the overlapped regions.

15. The method according to claim 2, wherein the method is performed by an external control apparatus independent of an internal control apparatus of the robot.

\* \* \* \* \*